(12) United States Patent
Cavallaro et al.

(10) Patent No.: US 10,301,073 B1
(45) Date of Patent: May 28, 2019

(54) ROBUST SOFT TEXTILE TRANSFER CASE FOR CONTAMINATED MATERIALS

(71) Applicants: Paul V Cavallaro, Raynham, MA (US); Andrew W Hulton, Mansfield, MA (US); Gregory J Gudejko, Cranston, RI (US); Dustin T Green, Fredericksburg, VA (US)

(72) Inventors: Paul V Cavallaro, Raynham, MA (US); Andrew W Hulton, Mansfield, MA (US); Gregory J Gudejko, Cranston, RI (US); Dustin T Green, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/688,145

(22) Filed: Aug. 28, 2017

Related U.S. Application Data

(60) Provisional application No. 62/382,313, filed on Sep. 1, 2016.

(51) Int. Cl.
| | |
|---|---|
| *B65D 30/00* | (2006.01) |
| *B65D 53/00* | (2006.01) |
| *B65D 30/10* | (2006.01) |
| *B65D 33/16* | (2006.01) |
| *B65D 75/52* | (2006.01) |
| *B32B 5/02* | (2006.01) |
| *B32B 27/36* | (2006.01) |
| *A61J 1/00* | (2006.01) |

(52) U.S. Cl.
CPC .............. *B65D 29/00* (2013.01); *A61J 1/00* (2013.01); *B32B 5/024* (2013.01); *B32B 27/36* (2013.01); *B65D 31/16* (2013.01); *B65D 33/1641* (2013.01); *B65D 53/00* (2013.01); *B65D 75/525* (2013.01)

(58) Field of Classification Search
CPC .... B65D 29/00; B65D 31/16; B65D 33/1641; B65D 53/00; B65D 75/525; A61J 1/00; B32B 5/024; B32B 27/36
USPC .............................................. 383/68, 69, 117
See application file for complete search history.

(56) References Cited

U.S. PATENT DOCUMENTS

| | | | | |
|---|---|---|---|---|
| 2,398,477 | A | * | 4/1946 | Tucker .................. A61G 17/06 27/2 |
| 2,601,568 | A | * | 6/1952 | Sussenbach .......... B65D 35/10 220/684 |
| 3,462,027 | A | * | 8/1969 | Puckhaber ............. B60P 7/065 206/522 |

(Continued)

*Primary Examiner* — Jes F Pascua
(74) *Attorney, Agent, or Firm* — James M. Kasischke; Michael P. Stanley

(57) ABSTRACT

A soft transfer case for biological and chemical material is provided. The transfer case includes a film-laminated, woven textile exterior layer as a pouch resembling an open cylinder. The cylinder is capable of being clamped at each end of the cylinder. A pouch shaped and single open end elastomeric bladder capable of containing biological and chemical material can be contained by the exterior layer. The bladder requires only one seam which is used to permanently seal the open end with the material contained therein. Upon pressurization of the bladder, the exterior layer expands and a restraining force is generated between the textile layer and the clamps.

6 Claims, 6 Drawing Sheets

(56) References Cited

U.S. PATENT DOCUMENTS

| | | | | |
|---|---|---|---|---|
| 3,602,221 A | * | 8/1971 | Bleicken | B63C 11/325 |
| | | | | 128/205.26 |
| 4,009,287 A | * | 2/1977 | Clarke | B65D 37/00 |
| | | | | 206/525 |
| 2017/0368790 A1 | * | 12/2017 | DeCoste | G01M 3/3272 |

* cited by examiner

ROBUST SOFT TEXTILE TRANSFER CASE FOR CONTAMINATED MATERIALS

The present application claims the benefit of U.S. Provisional Application Ser. No. 62/382,313 filed on Sep. 1, 2016 by the inventors, Paul Cavallaro, Andrew Hulton, Gregory Gudejko and Dustin Green and entitled "Robust Soft Textile Transfer Package for Contaminated Materials".

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention applies to the field of containers used in the transport of biologically or chemically contaminated hazardous contents.

(2) Description of the Prior Art

Current international standards impose strict requirements on the air transport of biologically and chemically hazardous materials. Existing container solutions are designed for small samples rather than larger contents. The maximum stress and stress distributions in larger containers vary considerably based on the size, shape and wall thickness of the container. While safe shipping requirements are attainable for small scale containers at a given internal pressure; larger scale containers encounter significantly higher stresses at the same internal pressure due to the increased volume of the container.

Also, significantly greater stresses are developed during drop impact and puncture tests due to the increased content and container weights. Working and shipping standards for use require a leak-proof seal without an allowance for pressure relief. While the container would likely never need to be reopened after the insertion of the contaminated contents; ease of use in portability (a low weight) and time to seal the container (sealing in less than 30 minutes) are desired.

As such, there is a need to increase transfer container sizes in order to accommodate the safe transport of contaminated human remains and other comparably sized contents. Performance metrics require that the containers be sealable within thirty minutes after the insertion of the contents; be puncture resistant; be leak-proof at a hydrostatic pressure of at least thirty-six pounds per square inch; remain leak-proof after a thirty foot drop when filled with water to at least a ninety-eight percent capacity by volume; be transportable by air and by an industry-sized pallet; prevent rapid decompression without a method for pressure relief; and not exceed two hundred pounds in weight. The requirements for a larger container should also permit the use of multiple material components and layers.

SUMMARY OF THE INVENTION

Accordingly, it is a general purpose and primary object of the present invention to provide a high strength and comparatively high volume impermeable container.

It is a further object of the present invention to provide a low weight container that can be used for the safe transport of biological and chemically contaminated hazardous contents.

In order to attain the objects of the present invention, a robustly constructed container is provided. The container is a soft goods transfer case having a film-laminated, woven para-aramid synthetic fiber textile exterior layer. The exterior layer is a circular woven preform constructed without seams and of continuous warp yarns along a longitudinal axis and continuous weft yarns along a hoop (circumferential) axis. In a final form for use, the soft transfer case is shaped as a soft flexible lay-flat structure similar to a large woven fabric circular air beam.

To prevent air leakage during operation, the soft transfer case has a molded elastomeric bladder containable within the outer circular woven preform. The fabric layer of the woven preform resists expansion when the interior bladder is inflated. The woven preform resembles an open cylinder, and when assembled with the bladder and end clamps, prevents leakage of fluids and gasses. Such a circular woven preform eliminates lengthwise seams and requires only two mechanical terminations—one termination with end clamps at each end of the circular preform. Also, the structural and air-retention functions are not performed on the same layer with strength of the structure provided by the exterior fabric layer of the preform and air(gas)/fluid retention provided by the bladder enclosed in the preform. The strength of the transfer case and the air/fluid retention functions are intentionally decoupled.

In use, the soft transfer case opens to allow the insertion of significantly larger sized contents of biologically or chemically hazardous materials. After insertion, the transfer case is then sealed to protect the transport of the materials against drop impact, puncture and rapid decompression. After the insertion of the materials into the transfer case, the transfer case will likely never be reopened.

The transfer case of the present invention is puncture resistant and leak proof at a hydrostatic pressure of at least thirty-six pounds per square inch. The container remains leak-proof after a thirty foot drop at thirty-two degrees Fahrenheit and a greater than three foot drop on a rigid rod having a diameter of one and a half inches. The transfer case is also air transportable and resistant to rapid decompression. Furthermore, the transfer case enables the safe repatriation of biologically or chemically contaminated human remains, animal remains, protective equipment or other material in accordance with existing standards of use.

BRIEF DESCRIPTION OF THE DRAWINGS

Other objects, features and advantages of the present invention will be better understood by means of a detailed description of the drawings that illustrate the principals of the present invention in which.

DETAILED DESCRIPTION OF THE INVENTION

Figure 1:
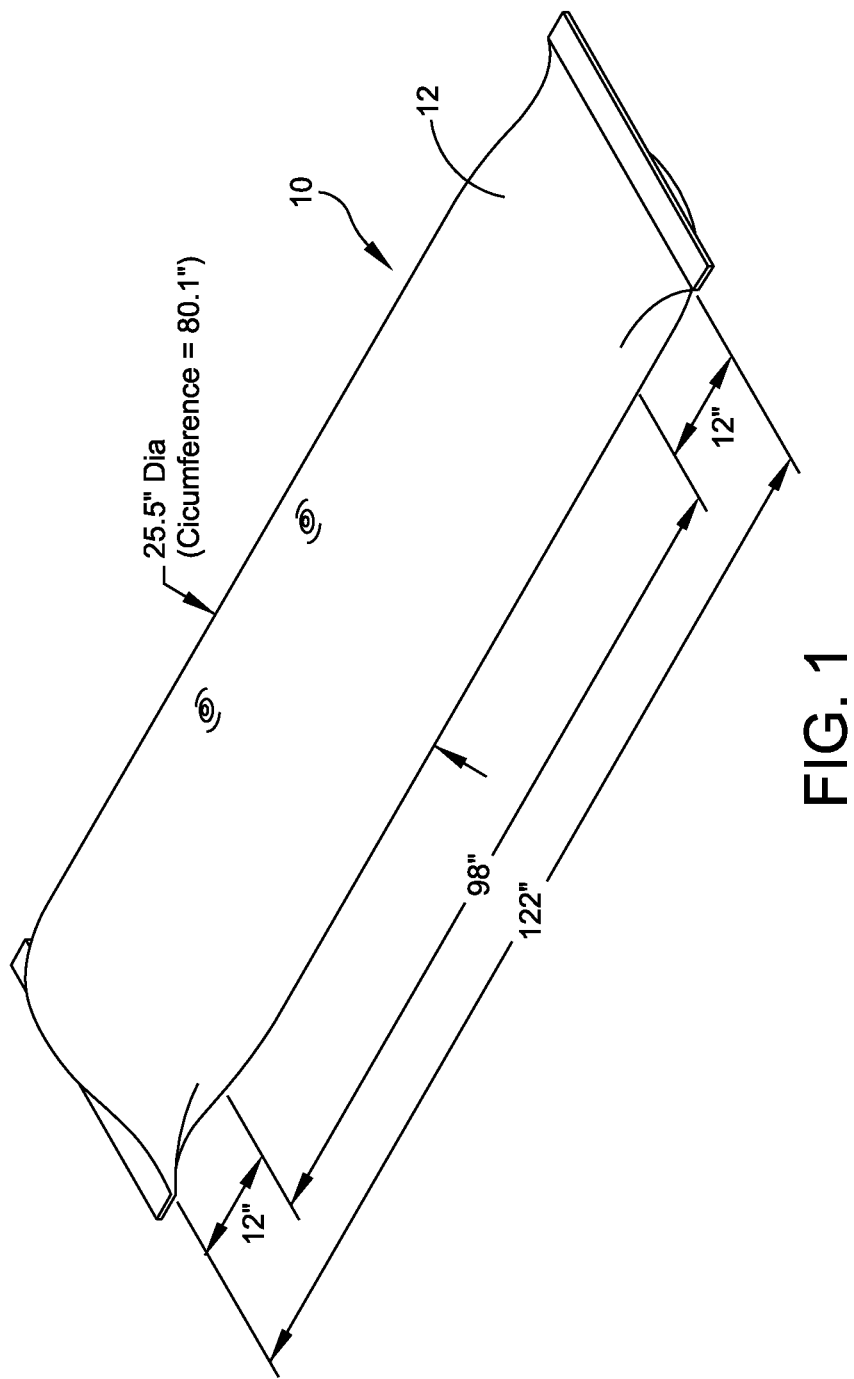
FIG. 1 depicts a dimensioned isometric view of a soft transfer case of the present invention.

Referring now to the drawings, and more particularly to FIG. 1, a soft transfer case 10 with an outer layer 12 is shown. The twelve inch dimension in the figure represents the approximate length of a transition of the transfer case 10 from a cylinder to a tapered geometry at mechanical end clamps 20 when the transfer case is subject to an internal pressure. The ninety-eight inch dimension represents the approximate length of a cylindrical region of the transfer case 10 when the transfer case is subject to internal pressure. A preferred overall length of the transfer case 10 is one hundred and twenty-two inches with a circumference of at least eighty inches.

Figure 2:
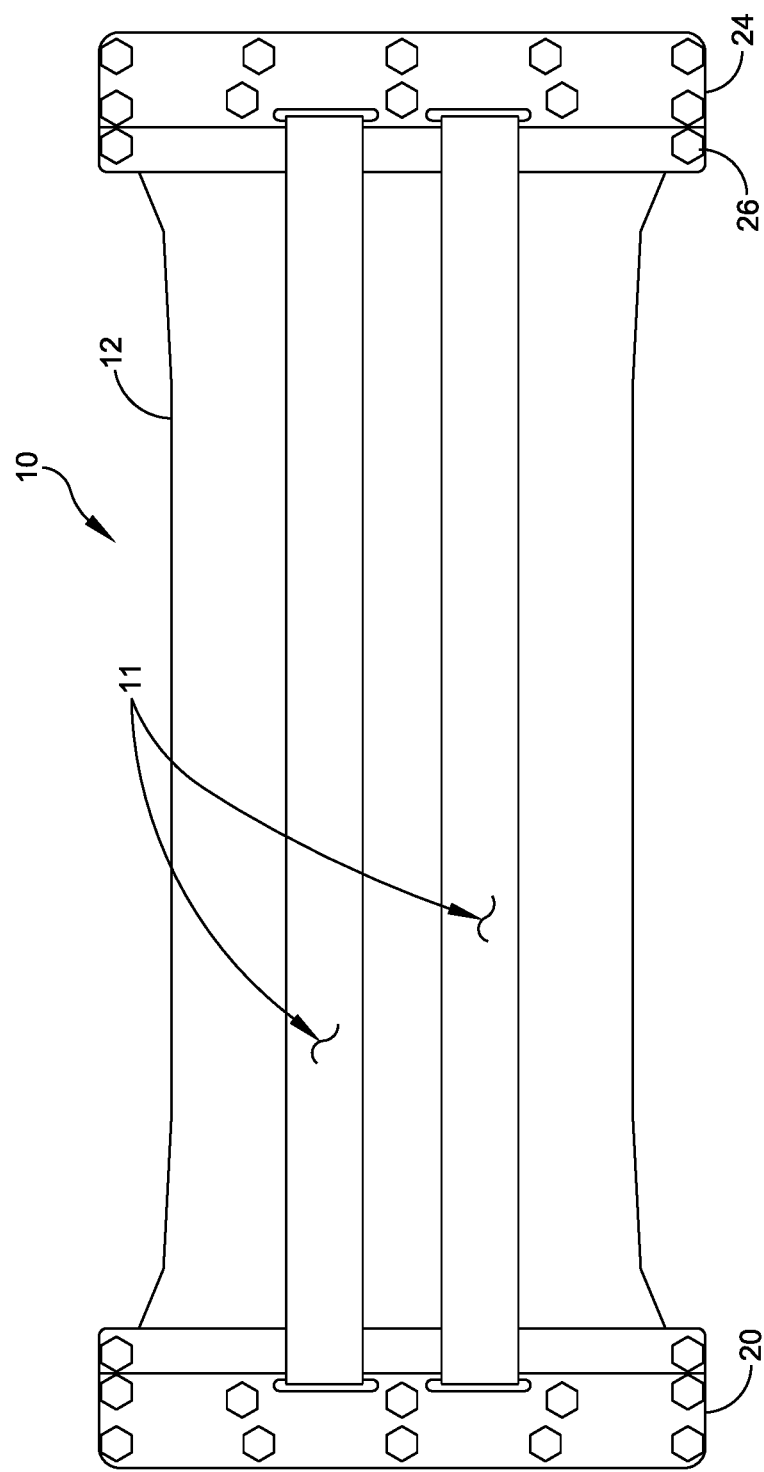
FIG. 2 is a plan view of the soft transfer case of the present invention with longitudinal retention straps and a mechanical clamping assemblies shown.
Figure 3:
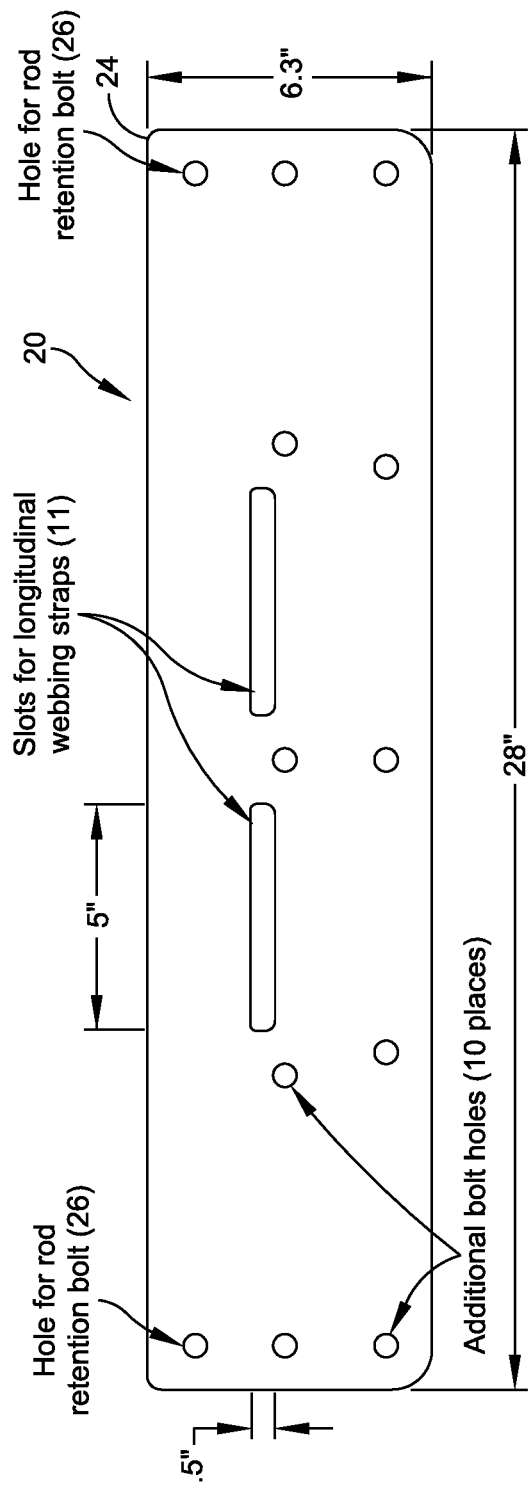
FIG. 3 is a plan view of a mechanical end clamp used to close the soft transfer case of the present invention.
Figure 4:
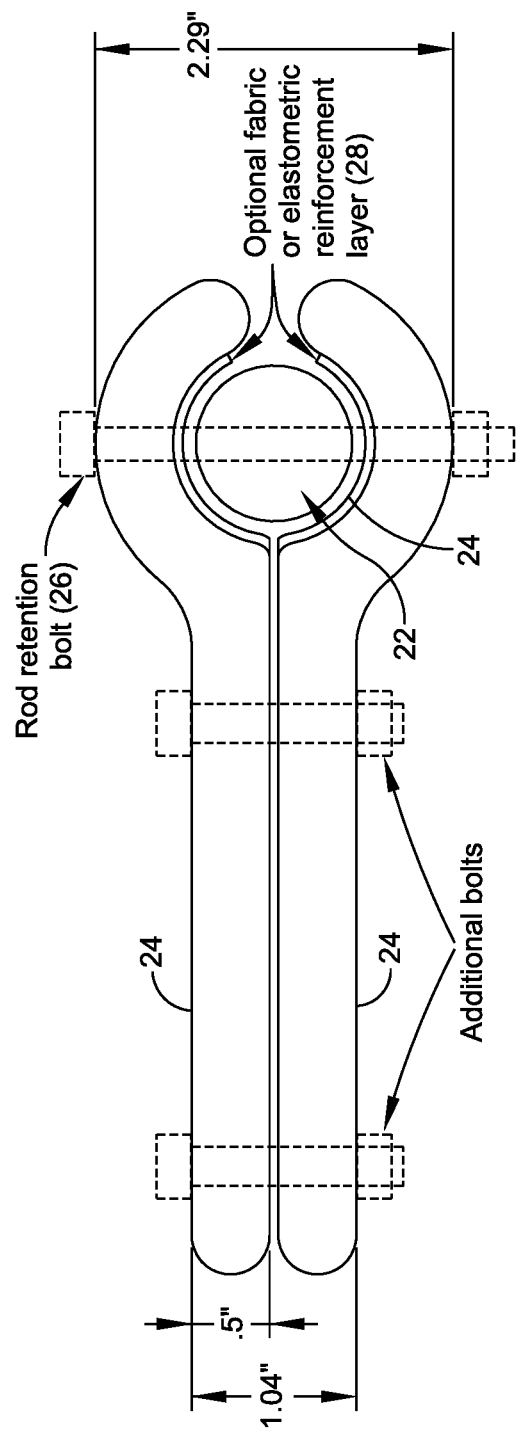
FIG. 4 is a side of the mechanical end clamp of the present invention.

As shown in FIG. 2, the soft transfer case 10 includes longitudinal retention straps 11 with the transfer case secured by the bolted mechanical end clamps 20 (See FIG. 3 and FIG. 4 for additional detail on the end clamps). The longitudinal retention straps 11 are flat webbing, similar to the material of seat belts and can be made of polyester fibers or any other similar structural material. The outer layer 12 of the transfer case 10 is a continuously woven, circular textile (i.e., Para-aramid synthetic fiber or other high performance fibers) preform layer (See FIG. 5 for additional detail on the fiber arrangement of the preform layer).

In operation, the outer layer 12 reacts against pressurization; confines volumetric expansion of an internal bladder; and prevents puncture and impact damage. The textile layer 12 is optionally film laminated or surface coated; however, such a film or coating is only used to protect the fibers from environmental effects and is not to act as the primary bladder for pressure retention purposes. Flexible elastomeric coatings such as urethanes are appropriate for use, provided that the films or coatings behave as flexible membranes. The use of elastomeric films or coatings can be optionally applied to the yarns before weaving or sprayed/brushed on after the soft transfer case 10 is constructed. Laminations are generally only applied to the fabric after weaving.

As shown in FIG. 6A-6E, a layer enclosed by the outer textile layer 12 is a separate internal membrane that serves as an oversized (at a size at least fifteen-twenty percent greater than the inflated preform size) impermeable bladder 14 that can provide air retention. The gas/fluid retention member is the oversized bladder 14, specifically the internal membrane of the bladder. After the bladder 14 is installed inside the outer textile layer 14 and upon inflation of the bladder, the expansion of the internal membrane of the bladder is resisted by the outer textile layer.

As shown in FIG. 3 and FIG. 4, end terminations for the outer textile layer 12 are each a mechanical clamp 20 constructed of three components. The components are a solid rod 22 fitted within a slotted sleeve formed by clamshell plates 24 and secured by retention bolts 26 or other mechanical fasteners. This type of end clamp has been used successfully for strap-reinforced, braided inflatable air beams designed for military shelters.

Each end of the circular woven preform of the soft transfer case 10 is wrapped over a separate solid rod 22. The slotted sleeve of a clamshell plate 24 is inserted over each rod 22 to secure the preform. The mechanical clamps 20, as shown, do not engage and secure the bladder 14. However, the mechanical clamps 20 can be optionally designed to simultaneously secure the bladder 14 and the outer textile layer 12.

Upon pressurization of the bladder 14, the preform of the outer textile layer 12 develops a cylindrical form (remote from the ends), as shown by the twelve inch measurements in FIG. 1, which then resists further expansion of the internal bladder. The stresses due to inflation are distributed to minimize concentrations and to avoid failures at rip points. This is an important reason for the fabric design approach of the outer textile layer 12 in which maximum stresses occur at the cylindrical region and not at the transition or clamped regions.

A clamping force is generated between the outer textile layer 12 and the mechanical clamps 20. The mechanical clamps 20 apply an increasing restraining force upon increasing internal pressure. As shown in FIG. 4, the mechanical end clamp 20 with an optional bonded elastomeric liner 28 assists in reducing stress concentrations in the outer textile layer 12 at an interface of the clamp.

Figure 5:
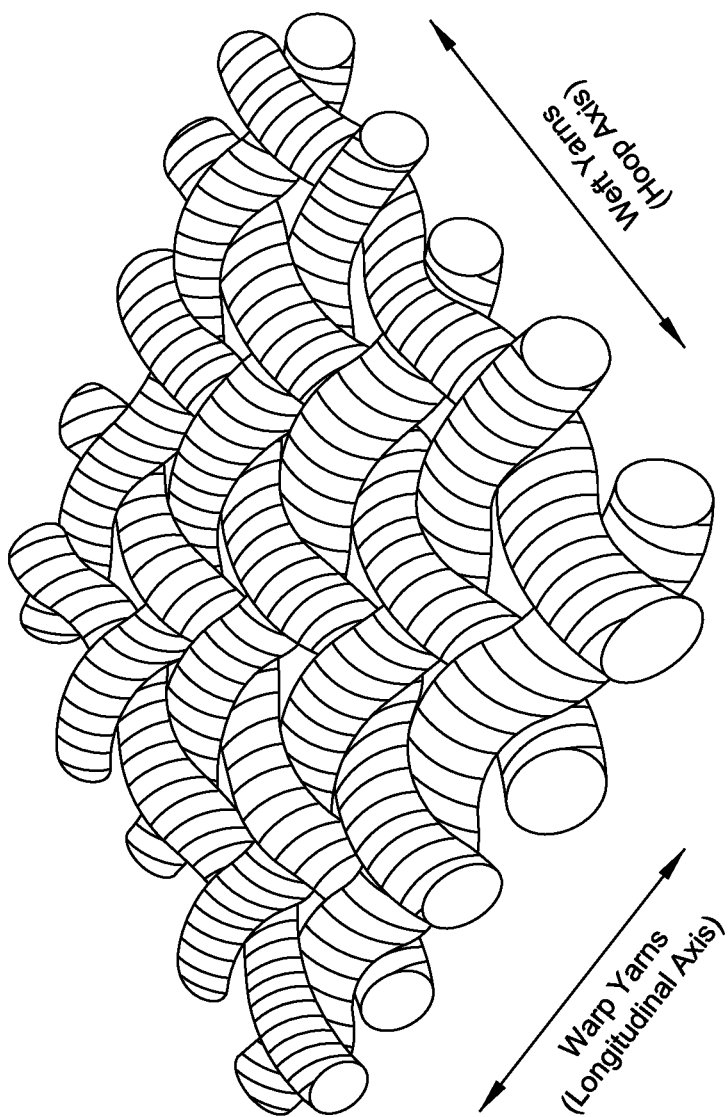
FIG. 5 is a detailed view of the weave pattern for the textile outer layer of the soft transfer case of the present invention.

As shown in FIG. 5, the preform of the outer textile layer 12 is formed by using plain-woven and dense fabric architecture. A circular weaving process produces a right-circular cylinder of the outer layer 12 with open ends and no seams. Dense implies that the plain weave is tightly woven so that light cannot shine through and that pointed objects will not force the yarns to separate (migrate) away from the point of impact or puncture. Denseness of the textile preform is controlled by the number of warp and weft yarns per unit distance of fabric.

In a plain woven fabric, the warp yarns cross over and under consecutive weft yarns. Warp yarns are oriented along the longitudinal axis of the formed cylinder of the outer textile layer 12 of the soft transfer case 10. Weft yarns are aligned along the hoop or circumferential direction of the cylinder of the outer textile layer 12. As known in the art, warp yarns are in a longitudinal direction and weft yarns are in a hoop or circumferential direction to form the continuous cylindrical structure of the outer layer 12.

The highly dense, tightly woven fabric achieves a maximum puncture resistance and damage tolerance. A multi-layer warp and weft pattern could be used to provide additional protection against puncture and burst. Fabric density increases with increasing numbers of warp yarns per unit circumference and weft yarns per cylinder length. High density tightly woven fabrics restrict relative yarn motions from occurring such that the interstices (spaces between yarns) remain negligible when the outer textile layer 12 is mechanically stressed. If the relative yarn motions are significant; the interstices can become sufficiently large; thereby, exposing the internal bladder 14 to potential punctures and impact damage from sharp or pointed objects.

Having a six-thousands of an inch diameter for the yarn is preferred but other diameters are possible with testing.

Also, the yarns can be coated to minimize damage from weaving and to provide environmental protection when the soft transfer case 10 is used in field operations. A high performance fiber material is recommended for the fabric. PARA-ARAMID SYNTHETIC FIBER is such a material but other materials exist within this category such as Dimensionally Stable Polyester and VECTRAN (a liquid crystal polymer).

The bladder 14 is molded by using an elastomeric material in a pouch-shaped form having a single open end and is made of elastomeric materials such as urethane, rubber and silicone. The diameter and length of the bladder 14 is approximately ten to thirty percent greater than the diameter and length of the outer textile layer 12. This is important because oversizing the bladder 14 prevents the bladder from being subjected to stress when the soft transfer case 10 is pressurized.

Silicone is one of many choices but urethanes are also candidates for use. The selected material of the bladder 14 will be, in general, based upon compatibility with gasses and fluids that are contained in the soft transfer case 10. The elastomeric material must meet the biological and chemical resistance requirements. Silicone and other materials options exist, including thermoplastic urethane.

After molding, the open end of the bladder 14 is rolled up on itself to allow easy insertion of the contaminated materials inside the container. The bladder 14 requires only one seam which is used to permanently seal the open end. Seaming can be done at the point of use by a variety of known methods including heat sealing, adhesive bonding and RF welding.

Figure 6A:
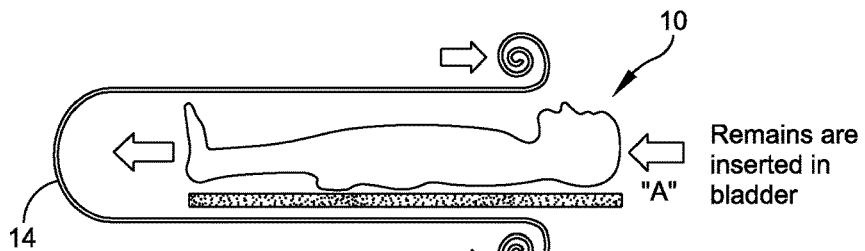
FIG. 6A depicts human remains inserted in the bladder of the soft transfer case of the present invention.
Figure 6B:
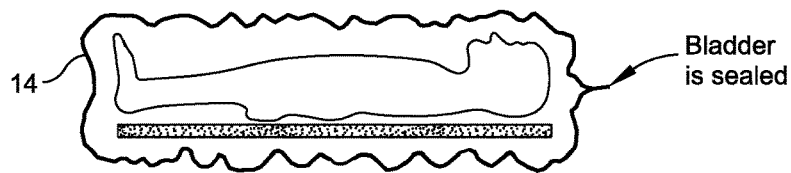
FIG. 6B depicts the bladder of the present invention with human remains inserted and with the bladder closed by sealing.
Figure 6C:
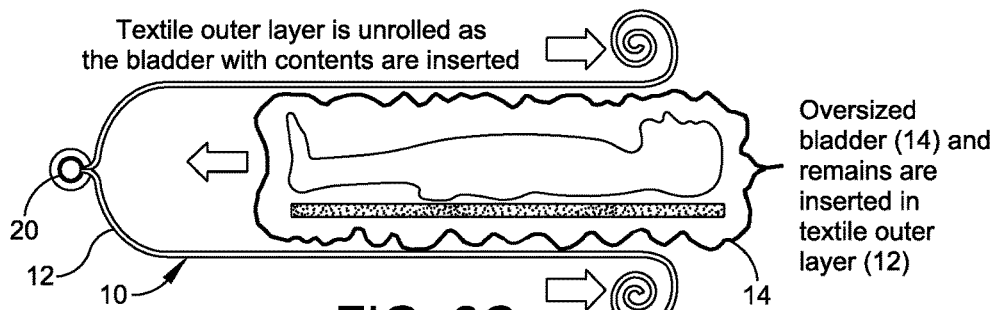
FIG. 6C depicts the bladder of the present invention inserted in the textile outer layer of the present invention.
Figure 6D:
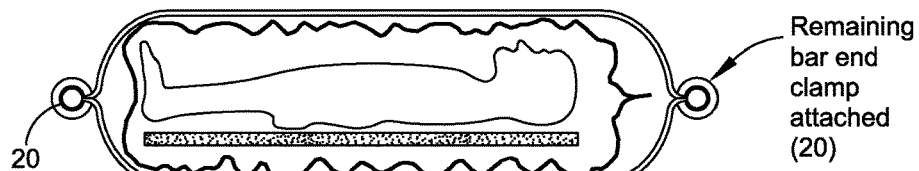
FIG. 6D depicts the textile outer layer of the present invention with the mechanical end clamps attached.
Figure 6E:
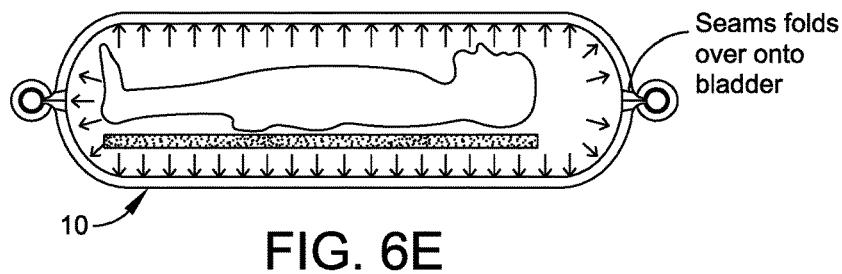
FIG. 6E depicts interior pressure vectors on the textile outer layer of the present invention.

More specifically, the sequence of operation is illustrated in FIGS. 6A-6E in which the bladder 14 is received for field use in a rolled up configuration. As shown in FIG. 6A, the contaminated contents (or human remains) are placed inside the bladder 14 as the bladder is unrolled or after the bladder is unrolled—depending on whatever is easier for the operator or the size of the remains. As shown in FIG. 6B, the bladder 14 is then sealed along the single open end seam and remains unstressed at an ambient pressure (i.e., $p_{internal} = p_{external}$). As shown in FIG. 6C, the bladder 14 with contents is inserted within the outer textile layer 12 and in FIG. 6D, the mechanical clamps 20 are attached with a seam of the outer textile layer folding over the bladder. The strength of the mechanical end clamps 20 is greater than the strength of the outer textile layer 12 to ensure that the outer layer will fail first.

During air transport, rapid decompression of a closed container can be a dangerous event and must not occur. When using the soft transfer case 10 at high altitudes; a pressure differential can develop such that the bladder 14 becomes internally pressurized as $p_{internal}$ is greater than $p_{altitude}$. The bladder 14 expands with the preform of the outer textile layer 12 but does so without stretching. The outer textile layer 12 then becomes biaxially stressed along the longitudinal and circumferential directions of the fabric; resists further expansion of the bladder 14; and develops a shape that achieves static equilibrium. Static equilibrium is achieved when inflation causes the soft transfer case 10 to develop biaxial stress states so that a stationary or stable configuration (geometry) does not experience any dynamical effects (flutter, vibration, etc) is produced. Because the bladder 14 remains unstretched at all times in the presence of the remaining preform; no stresses are developed within the bladder.

The preform of the outer textile layer 12 resists the bladder 14 from freely expanding. If the bladder 14 is oversized for the volume contained by the outer textile layer 12 then the bladder cannot be subject to stress. The bladder 14 is restricted from straightening out to a full shape by the outer textile or fabric layer 12. If the bladder 14 cannot completely straighten out; then the bladder cannot stretch and therefore the bladder cannot experience strain or stress.

Upon pressurization of the bladder 14, the preform of the outer textile layer 12 expands and a mechanical restraining force is generated between the textile layer and the mechanical clamps 20. When the bladder 14 is designed not to be secured to the mechanical clamps 20; the bladder simply conforms to the presence of the rod 22.

Several advantages using the chemically/biologically resistant soft transfer case 10 of the present invention include: the decoupling of the structural and air retention functions by utilizing physically and distinct separate layers; the use of an oversized elastomeric bladder 14 that, when inserted inside the smaller textile outer layer 12, expands without stretching and therefore does not experience stress with internal pressurization such that air retention performance of the bladder and single seam remain independent of internal pressure; the use of soft good components such as the structural and bladder elements that enable roll-form delivery to point-of-use.

The outer layer 12 is used as a compliant structural layer that minimizes system weight and that minimizes stress from pressurization (the peak stresses are remote from the ends with stress distributions uniformly distributed remote from the ends). The stresses from drop impacts are less than those produced in conventional rigid structures.

Also, the soft transfer case 10 of the present invention utilizes a woven fabric having orthogonally arranged fiber placement such that the fabric resists lengthwise expansion directly by the longitudinal fibers and therefore does not require the use of tension strap reinforcements although the longitudinal straps 11 are preferably used.

The structural benefits of using a circular woven material for the outer textile layer 12 is that upon pressurization, a cylindrical shape is developed and bi-axial stresses are uniformly distributed and remote from the ends. Furthermore, the maximum tensile stress is located in the cylindrical portion of the shape away from the clamped ends and localized stress concentrations and a 2:1 ratio of circumferential to longitudinal stress per unit distance is produced.

Another major advantage of the soft transfer case 10 of the present invention is that the outer layer 12 can be supplied to the field in roll form. Rolling the fabric outer layer 12 will minimize logistics, inventory and supply control activities. The proper length of the preform outer textile layer 12 can be unrolled and cut to the required length for further use.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A reusable soft transfer case for containing biological and chemical material, said transfer case comprising:

an elastomeric bladder with an open end including a sealing component wherein said bladder is capable of containing the material and forming a seam at said sealing component once the material is contained;

an outer layer capable of enclosing said bladder to be in movable contact with said bladder, said outer layer being a continuously woven textile preform cylindrical layer having a first open end and a second open end;

a first mechanical clamp having a solid rod and two plates with each of said plates having a curved end forming a recess; and a second mechanical clamp having a solid rod and two plates with each of said plates having a curved end forming a recess;

wherein the first end of said outer layer is capable of being wrapped over a longitudinal surface of said rod of said first clamp with a slotted sleeve formed by each of said plates of said first clamp and mechanically fastened and with the slotted sleeve inserted over said rod to secure the first end of said outer layer once the material is contained in said bladder;

wherein the second end of said outer layer is capable of being wrapped over a longitudinal surface of said rod of said second clamp with a slotted sleeve formed by each of said plates of said second clamp and mechanically fastened and with the slotted sleeve inserted over said rod to secure the second end of said outer layer once the material is contained in said bladder.

2. The soft transfer case of claim 1, wherein said cylindrical section of the outer layer has a length of one hundred and twenty-two inches and a circumference of at least eighty inches.

3. The soft transfer case of claim 2, wherein said outer textile layer is surface coated.

4. The soft transfer case of claim 3, wherein the material of said outer layer is Para-aramid synthetic fiber.

5. The soft transfer case of claim 4, wherein the material of said bladder is silicone.

6. The soft transfer case of claim 5, wherein said outer textile layer is formed by using plain-woven fabric architecture with warp yarns crossing over and under consecutive weft yarns wherein the warp yarns are oriented along a longitudinal axis of said cylindrical layer and weft yarns are aligned along a circumferential direction of said cylindrical layer.

* * * * *